(12) United States Patent
Wooley et al.

(10) Patent No.: US 7,625,086 B2
(45) Date of Patent: Dec. 1, 2009

(54) METHOD OF DESIGNING MULTIFOCAL CONTACT LENSES

(75) Inventors: C. Benjamin Wooley, Jacksonville, FL (US); Russell T. Spaulding, Jacksonville, FL (US); Susan W. Neadle, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 23 days.

(21) Appl. No.: 11/845,967

(22) Filed: Aug. 28, 2007

(65) Prior Publication Data

US 2009/0059167 A1 Mar. 5, 2009

(51) Int. Cl.
*G02C 7/04* (2006.01)
(52) U.S. Cl. ...................... 351/177; 351/161
(58) Field of Classification Search ......... 351/159–176, 351/177
See application file for complete search history.

(56) References Cited

U.S. PATENT DOCUMENTS

| | | | |
|---|---|---|---|
| 5,822,091 | A | 10/1998 | Baker |
| 6,089,711 | A | 7/2000 | Blankenbecler et al. |
| 2002/0176049 | A1 | 11/2002 | Sakai et al. |
| 2004/0169820 | A1 * | 9/2004 | Dai et al. .................... 351/246 |
| 2007/0097318 | A1 | 5/2007 | Chehab et al. |

FOREIGN PATENT DOCUMENTS

| | | |
|---|---|---|
| EP | 0806694 A2 | 11/1997 |
| EP | 1347328 A1 | 9/2003 |
| EP | 1754992 A1 | 2/2007 |
| WO | WO 01/82839 A1 | 11/2001 |
| WO | WO 2004/053568 A1 | 6/2004 |
| WO | WO 2005/019906 A1 | 3/2005 |

OTHER PUBLICATIONS

M. Day, N.C. Strang, D. Seidel, L.S Gray, "The Influence of Spatial Frequency on Accommodation Step Responses," presented May 9, 2007 (Presentation Abstract).
E.M. Granger and K.N. Cupary, An Optical Merit Function (SQF), Which Correlates with Subjective Image Judgments, *Photographic Science and Engineering*, May-Jun. 1972, pp. 221-230, vol. 16, No. 3.
Peter G. Barten, "Contrast Sensitivity of the Human Eye and Its Effects on Image Quality," 1999, pp. 27-40, SPIE, Bellingham, Washington.

* cited by examiner

*Primary Examiner*—Darryl J Collins

(57) ABSTRACT

The invention provides methods for designing contact lenses that provides improved efficiency in lens design compared to conventional methods. It is a discovery of the invention that improved performance and reduced design time can be obtained by utilizing a visual performance prediction model as a part of the design process.

6 Claims, 9 Drawing Sheets

METHOD OF DESIGNING MULTIFOCAL CONTACT LENSES

FIELD OF THE INVENTION

The invention relates to multifocal ophthalmic lenses. In particular, the invention provides multifocal contact lens pairs in the design of which the neural contrast sensitivity function for each eye is taken into account.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate are lenses that have more than one optical power. In particular, multifocal contact and intraocular lenses have been developed in which zones of distance and near, and in some cases intermediate, powers are provided.

DETAILED DESCRIPTION OF THE INVENTION AND PREFERRED EMBODIMENTS

The invention provides methods for designing contact lenses, contact lenses designed according to the method, and methods for producing the lens, which lenses provide improved performance compared to conventional lenses. Additionally, the method of the invention provides improved efficiency in lens design compared to conventional methods because it reduces design development time. It is a discovery of the invention that improved performance and reduced design time can be obtained by utilizing a visual performance prediction model as a part of the design process.

In one embodiment, the invention provides a method for designing a multifocal contact lens pair comprising, consisting essentially of, and consisting of: (a.) providing a first lens design for a dominant eye of a lens wearer and a first lens design for a non-dominant eye of the lens wearer; (b.) selecting a first weighting function that is a function of a first neural contrast sensitivity function for application to the dominant eye lens design and a second weighting function that is a function of a second neural contrast sensitivity function for application to the non-dominant eye lens design; (c.) using the first weighting function for the first lens design and the second weighting function for the second lens design in a performance prediction model for each of the first and second lens designs, wherein the performance prediction model correlates measured performance for two or more lens designs with predicted performance for each of the first and second lens designs; and (d.) using the results obtained in step (c.) to optimize the first and second lens designs.

In the method of the invention, a predictive model is used to predict lens design performance on-eye, thus eliminating the need to manufacture the lens and test it on-eye. The predictive model uses the optical transfer function ("OTF") of the eye weighted by a function that itself is a function of the neural contrast sensitivity function ("NCSF") of the eye.

Figure 1:
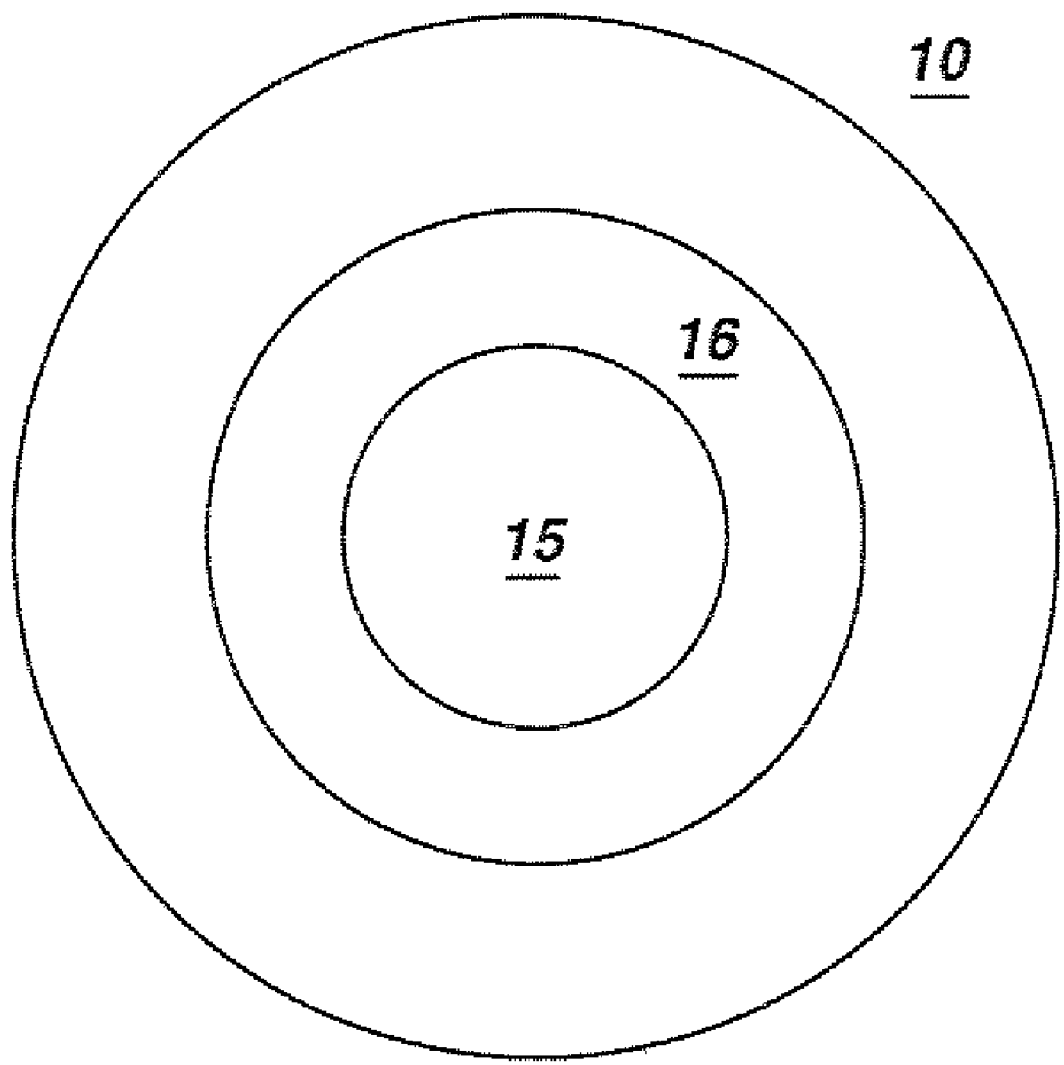
FIG. 1 is a plan view of s surface of a multifocal lens.

In the first step of the method of the invention, a first lens design for a dominant eye of a lens wearer and a first lens design for the non-dominant eye of the lens wearer are provided. By "dominant eye" is meant the eye that an individual prefers for use in carrying out tasks requiring distance vision. The design for each eye may be any desired design and preferably is a multifocal design, more preferably the design contains at least two, radially symmetric zones: a first zone that is a central zone and a second zone that is an annular zone that surrounds the central zone. The lens design for the dominant eye preferably has a central zone that is a distance vision zone, meaning a zone that provides the power required to substantially correct the lens wearer's distance vision acuity to the degree desired. The annular zone preferably is a near vision zone, meaning a zone that provides the power required to substantially correct the lens wearer's near vision acuity to the degree desired. For the non-dominant eye design, the central zone is preferably a near vision zone and the annular zone is a distance vision zone. Any number of additional zones may be included in the design, which zones may provide one or more of distance or near vision correction or intermediate power, meaning corrective power between that of the near and distance power. For illustrative purposes, a multifocal lens 10 is depicted in FIG. 1. The lens optic zone is composed of a central distance vision zone 15, a first annular zone of near vision power 16.

Figure 2:
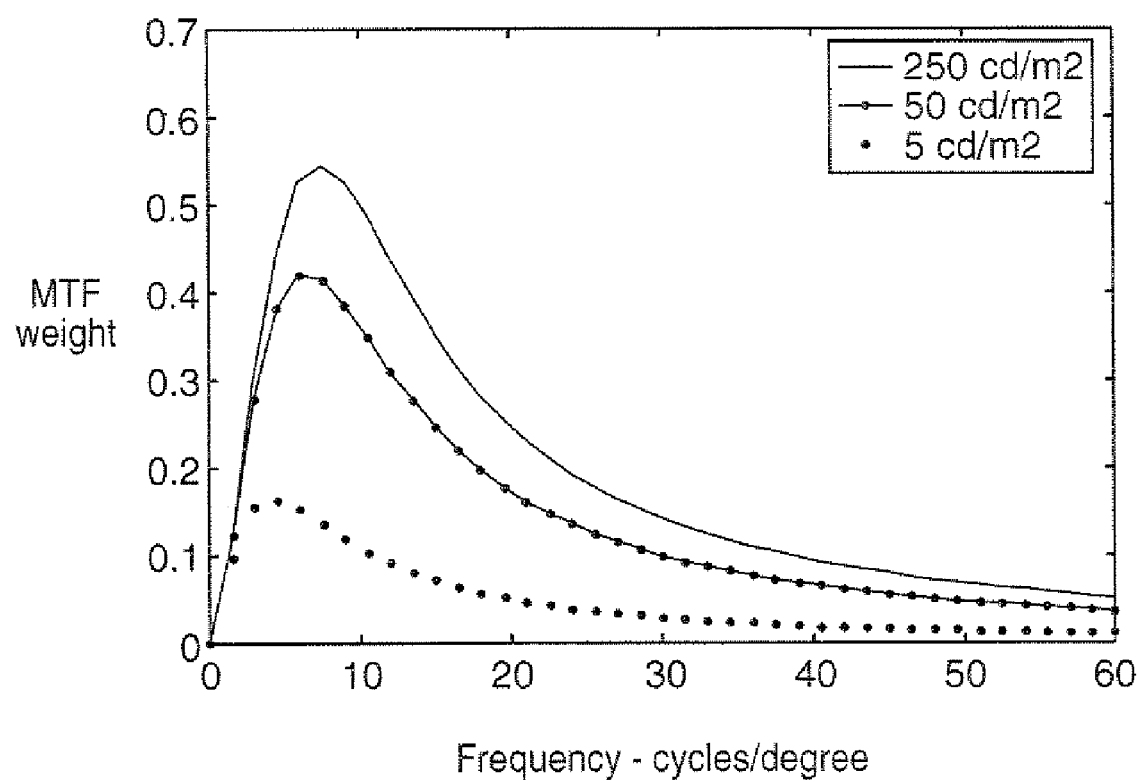
FIG. 2 is a graph of an NCSF.

In another step of the method of the invention, a weighting function that itself is a function of the NCSF of the eye is selected for application to the dominant eye lens design and a different such weighting function is selected for application to the non-dominant eye lens design. The NCSF is expressed as the log inverse threshold of perceivable contrast as a function of spatial frequency, object luminance, and pupil size. An example of a population average NCSF is shown in FIG. 2 in which is depicted a graph of contrast sensitivity plotted against spatial frequency as a function of retinal illuminance. In the plot shown, the function peaks at about 4 to 8 cycles per degree depending on the illuminance. Alternatively, the NCSF used in the weighting function may be for an individual rather than a population average.

It is one discovery of the invention that improved performance in a multifocal contact lens pair can be achieved by applying different weighting functions to the dominant and non-dominant eye of the lenses wearer. The wearer's dominant eye will be used predominantly for distance vision and to resolve fine details while the non-dominant eye will be use for near and intermediate vision tasks such as reading and viewing a computer monitor screen. The fine details in an object substantially correspond to high spatial frequency while the near and intermediate vision tasks substantially correspond to low and mid spatial frequencies. Thus, an optimal lens pair design cannot be achieved by a single weighting function being applied to the designs for both the dominant and non-dominant eyes. Rather, a different set of weights must be applied to each of the designs. In a preferred embodiment, the weighting function applied to the dominant eye lens design is the full NCSF, meaning a minimum equal to 0 and a maximum equal to 60 cycles per degree. That applied to the non-dominant eye lens design is a truncated form of the NCSF in which the minimum equals 0 and the maximum equals 12 cycles per degree.

In the method of the invention, the weighting function is used in the performance prediction model. The predictive model incorporates clinically measured visual performance data of lenses other than the lens or lenses to be designed and correlates the measured data with the predicted performance of the design. Thus, the model allows for the clinical performance of the lens being designed to be predicted without the need to manufacture a lens and test the design one-eye. One component of the prediction model is a mathematical eye model that includes a first surface that has the approximate shape of a corneal surface of an eye and includes aberrations that are equivalent to those of a human eye. The eye model may represent the average of a population of eyes, such as a Gullastrand-LeGrand eye or a Liou-Brennen eye, or it may be a model of an individual eye that uses measured corneal shape data along with measured wavefront aberrations. The predictive model mathematically permits placement of the contact lens design onto the model and calculation of the OTF at the retinal plane.

To calculate the predicted visual performance using the prediction model, the weighted area of the OTF ("$WA_{OTF}$") is first calculated according to the following equation:

$$WA_{OTF} = \int_{min}^{max} OTF(v, D, V) \times [\text{object contrast} \times NCSF(v, D, V, L)]^N \, dv \quad \text{(I)}$$

wherein:

max and min define the frequency range over which the integration is performed and, along with the NCSF and N define the weighting function;

OTF is the optical transfer function calculated for the lens design at the retinal plane;

v is the spatial frequency expressed as line pairs or cycles per degree ("cpd") of subtended angle at the fovea;

D is the pupil diameter in millimeters;

V is the vergence meaning the distance of an object being viewed expressed in inverse meters or diopters;

object contrast is a value between 0 and 1 that represents the contrast of the object being viewed;

NCSF is the neural contrast sensitivity function;

L is the luminance of the room expressed in candelas/m$^2$; and

N is an exponent with a value from 1 to −2, and preferably is 1.5.

The OTF for a lens design may be computed by any convenient method including, without limitation, use of a commercially available ray tracing software program, such as CODE V™. For a lens design that is not rotationally symmetric, the OTF may be calculated as the average of the two-dimensional OTF.

The calculated value $WA_{OTF}$ is correlated to the measured visual performance resulting in the ability to calculate and predict the visual performance of the design to use for optimization of the performance of that design. For example, the logmar acuity ("VA") preferably is calculated in accordance with the following equation:

$$VA = -11 + 2.82 * \log 10(WA_{OTF}) - 0.136 * \log 10(WA_{OTF})^2 \quad \text{(II)}$$

The coefficients of Equation II are determined by correlating the measured visual acuity to the calculated $WA_{OTF}$ for the designs used in the clinical testing The measured clinical data used in the prediction model is based on two or more lenses and preferably the data are obtained on subjects who are cyclopleged so as to relax their pupil and render them insensitive to convergence stimuli. Subjects are fitted with test lenses to achieve plano over-refraction. Visual acuity is measured in a test laboratory with controlled lighting using 90% and 10% contrast level charts. The acuity is measured as a function of defocus. By carefully controlling the test conditions, such as pupil size, accommodation, and light and contrast level, the correlation of measured results to predicted results may be high ($r^2 > 0.92$). Thus, the model may be used to predict design performance.

Any lenses may be used for the purpose of obtaining the measured clinical data. Preferably, the lenses used are of the same type, for example, single vision or multifocal, contact lens or intraocular lens as the lens design for which performance is being predicted. Additionally and preferably, the lenses cover the range of powers being designed for by the lens designer. For example, if the lens designer is designing a lens for myopes, the power range used in the prediction model is that suitable for myopes.

The result of the VA calculation provides the prediction of performance for the lens design under consideration. In the event that it is desirable to obtain better performance for the design, at least one parameter of the lens design may be altered, the same calculation may be applied to the altered design and the performance prediction again carried out. Preferably, the lens design for each eye is optimized to provide the desired visual performance. For example, for a multifocal design, the design may be optimized for the desired visual performance at distance, intermediate and near object distances for pupil sizes corresponding to low, medium, and high luminance levels. The parameters of the lens design that may be altered include, without limitation, ring radius, spacing, width, power and the like.

Although the invention has been illustrated in reference to the design of multifocal contact lens pairs, the invention may be used to design any type of contact lens or intraocular lens including, without limitation, a single multifocal lens, a single vision lens, a single vision or multifocal toric lens and the like.

Contact lenses that may be designed according to the invention preferably are soft contact lenses. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The invention may be clarified further by a consideration of the following, non-limiting examples.

EXAMPLES

Example 1

Figure 3:
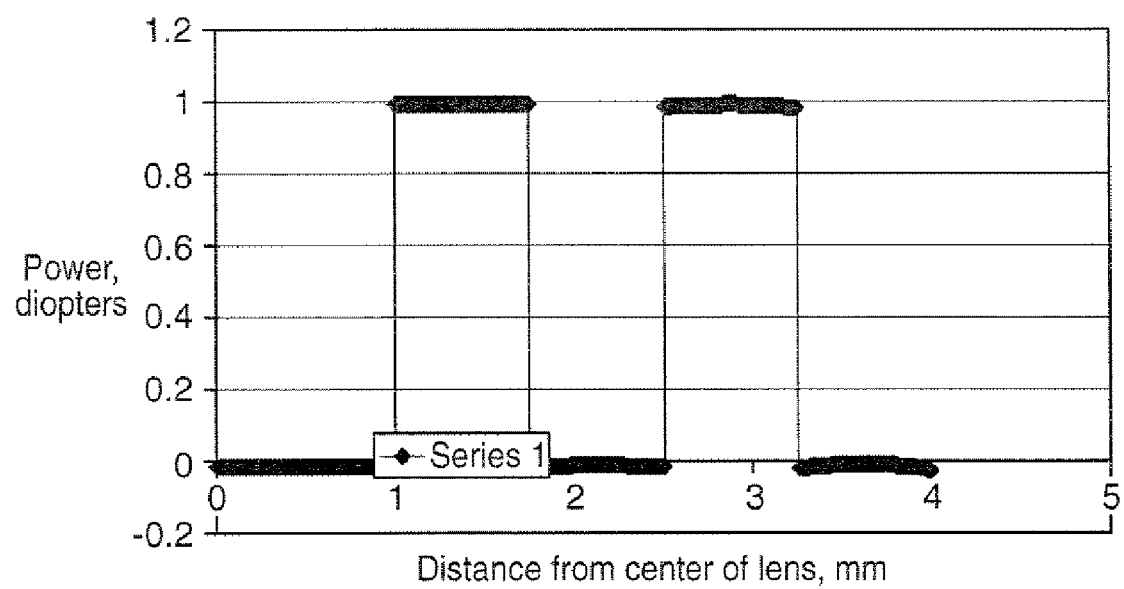
FIG. 3 is a radial power profile for a lens design for a dominant eye.
Figure 4:
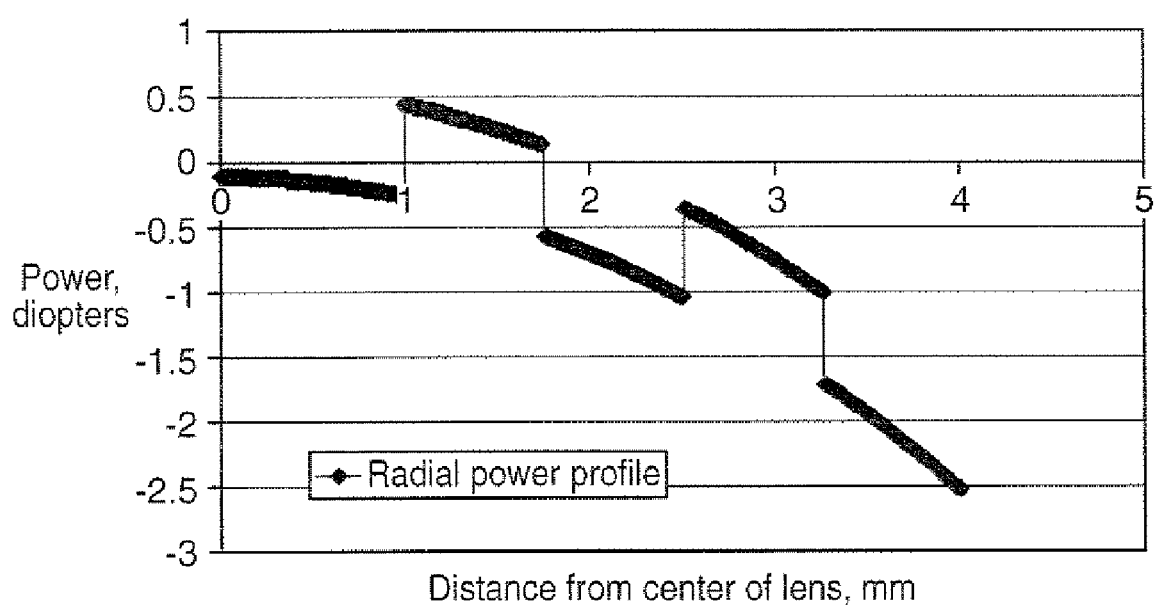
FIG. 4 is a radial power profile resulting from alteration of the design of FIG. 3 after application of an NCSF and use of performance prediction calculation.
Figure 5:
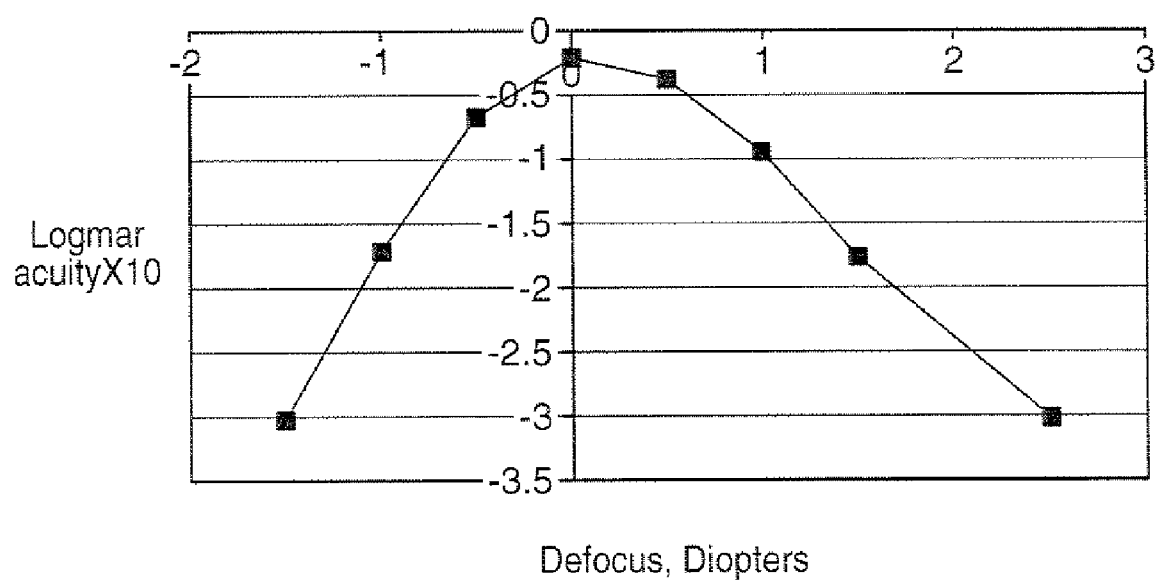
FIG. 5 is a graph of predicted performance for the lens design of FIG. 4.

A lens design was provided for a dominant eye, which design had five concentric zones located on the front surface of the lens. The power of the centermost zone, and every other zone moving from the center of the lens to the periphery, correspond to the nominal distance power of the lens. The remaining zones correspond to the nominal near power of the lens. The power profile for this lens is shown in FIG. 3. The NCSF shown in FIG. 2 was selected and the integration limits were chosen to be min=0 cpd and max=60 cpd. Using clinically measured VA data from three designs; a single vision design, a continuous asphere multifocal, and a ring type bifocal the coefficients of Equation II were determined to allow for the visual performance prediction model to be used to optimize the design performance. Being a lens for the dominant eye, the on-eye performance requirements for this particular design was for a lens that had very little compromise for distance objects, but that provided some add power to give a boost in the near performance. The lens was optimized to provide the through-focus visual performance predicted in FIG. 5 by changing the power difference between the center and near zones to 0.6 diopters, the asphericity within the zones to overcorrect the spherical aberration of the lens on eye combination by making the spherical aberration within the near and distance zones $-0.15$ D/mm$^2$, and the base power of the first distance zone is shifted $-0.1$ D. The resulting power profile is shown in FIG. 4.

Example 2

Figure 6:
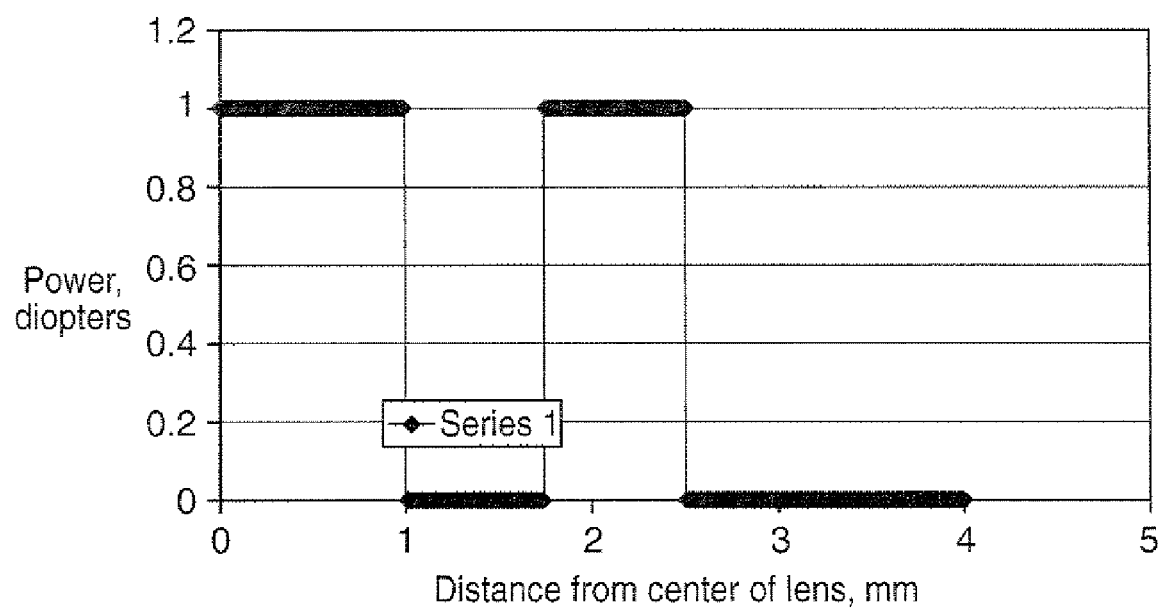
FIG. 6 is a radial power profile for a lens useful with a non-dominant eye.
Figure 7:
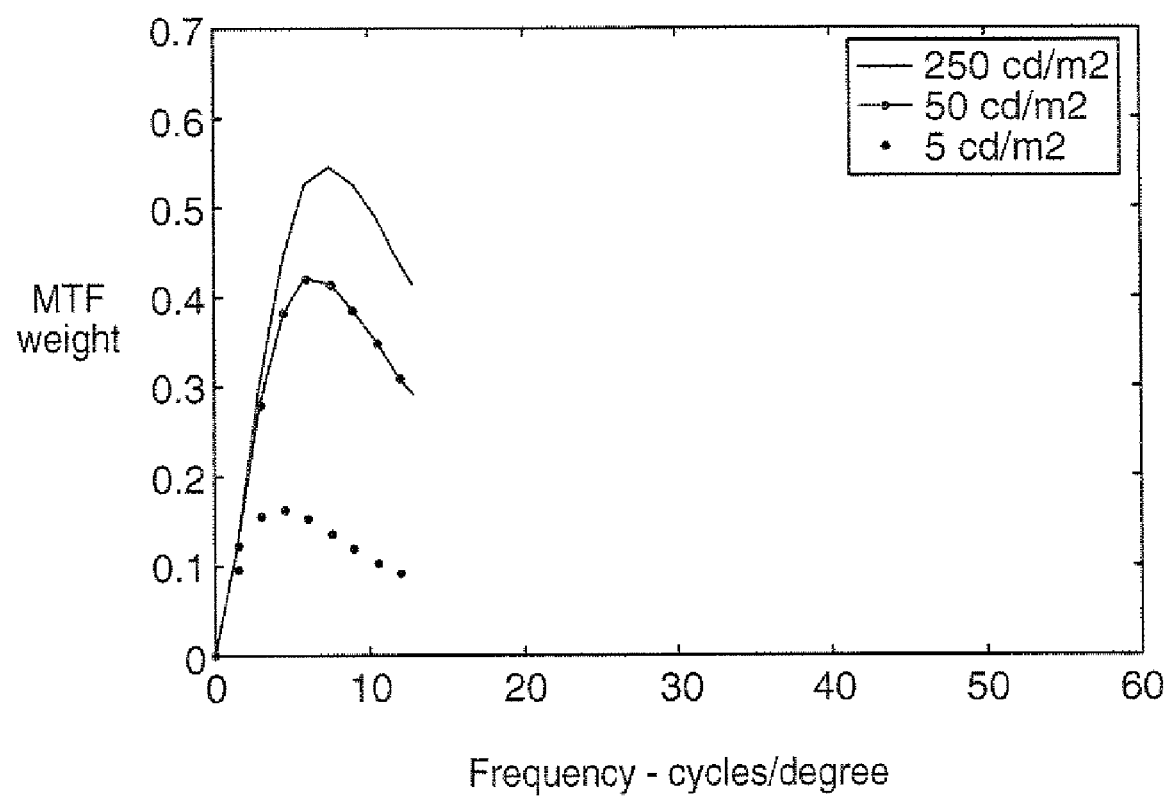
FIG. 7 is a graph of the NCSF applied to the design of FIG. 6.

A lens design was provided for a non-dominant eye, which design has four zones located on the front surface of the lens. The centermost and every other zone moving from the center to the periphery of the lens corresponded to the nominal near power of the lens and the remaining zones to the distance power as is depicted in FIG. 6. The NCSF used was weighted as shown in FIG. 7 with the integration limits of Equation I set to min=0 cpd and max=12 cpd. Using measured visual acuity data from three designs; a single vision design, a continuous asphere multifocal, and a ring type bifocal to develop correlation, Equation II becomes:

$$VA = -11 + 2.9 * \log 10(WA_{OTF}) - 0.141 * \log 10(WA_{OTF})^2$$

Figure 8:
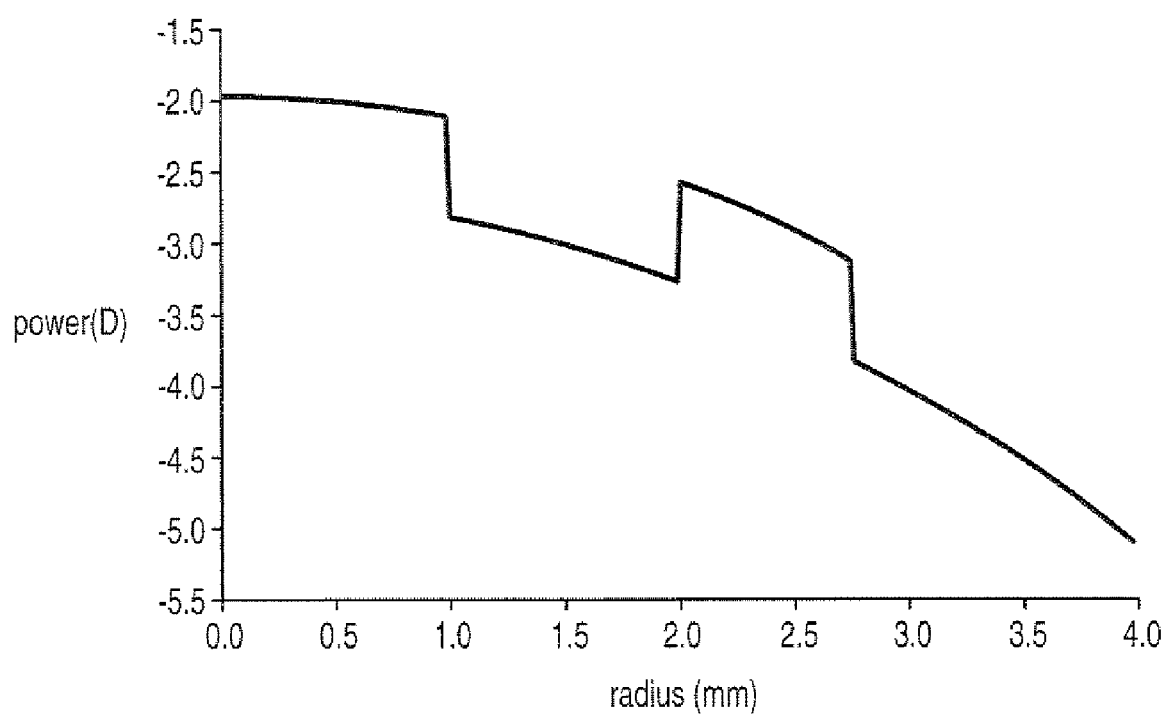
FIG. 8 is a radial power profile resulting from alteration of the design of FIG. 6 after application of the NCSF and use of performance prediction calculation.
Figure 9:
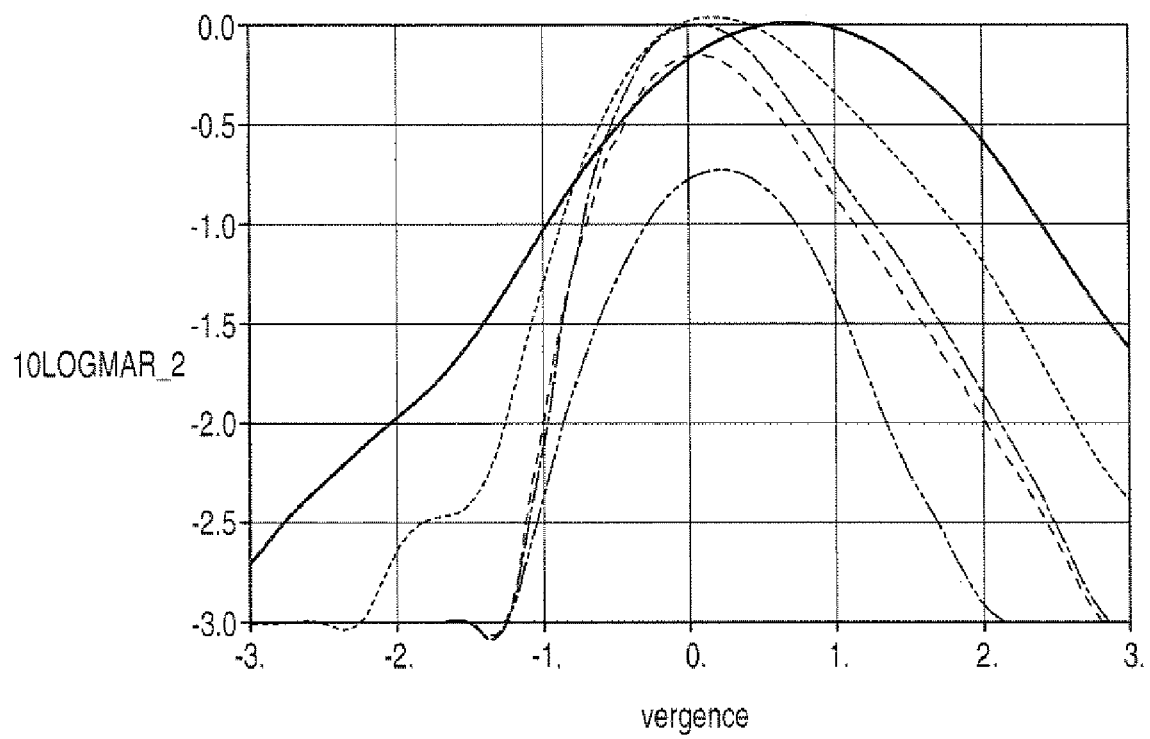
FIG. 9 is a graph of the through focus response for the design of FIG. 8.

Being for the non-dominant eye the performance of the this lens on-eye needs to have improved near performance and can allow a larger distance performance tradeoff than a design intended for the dominate eye. The design was optimized to provide the through-focus visual performance predicted in FIG. 9 by changing zone locations, the power difference between the center and near zones to 0.75 diopters and the asphericity within the zones to $-0.15$ D/mm$^2$. The power profile for the resulting design is shown in FIG. 8.

What is claimed is:

1. A method for designing a multifocal contact lens pair, comprising the steps of: (a.) providing a first lens design for a dominant eye of a lens wearer and a first lens design for a non-dominant eye of the lens wearer; (b.) selecting a first weighting function that is a function of a first neural contrast sensitivity function for application to the dominant eye lens design and a second weighting function that is a function of a second neural contrast sensitivity function for application to the non-dominant eye lens design; (c.) using the first weighting function for the first lens design and the second weighting function for the second lens design in a performance prediction models for each of the first and second lens design, wherein the performance predictive model correlates measured performance for two or more lens designs with predicted performance for each of the first and second lens designs; and (d.) using the results obtained in step (c.) to optimize the first and second lens design; wherein step (c) further comprises:

(i) calculating a predicted visual performance using the prediction model by first calculating a weighted area of an optical transfer function according to the following equation:

$$WA_{OTF} = \int_{min}^{max} OTF(v, D, V) \times [\text{object contrast} \times NCSF(v, D, V, L)]^N \, dv$$

wherein:
max and min define a frequency range over which the integration is performed;
OTF is the optical transfer function calculated for the lens design at a retinal plane;
v is a spatial frequency expressed as line pairs or cycles per degree of subtended angle at a fovea;
D is a pupil diameter in millimeters;
V is a vergence;
object contrast is a value between 0 and 1 that represents a contrast of an object being viewed;
NCSF is the neural contrast sensitivity function;
L is a luminance of a room expressed in candelas/m$^2$; and
N is an exponent with a value from 1 to $-2$
and (ii) correlating the WA$_{OTF}$ to a measured visual performance of the two or more lenses.

2. The method of claim 1, wherein substep (ii) is carried out by calculating a logmar acuity in accordance with the following equation:

$$VA = -11 + 2.82 * \log 10(WA_{OTF}) - 0.136 * \log 10(WA_{OTF})^2$$

wherein each of the coefficients of the equation are determined by correlating the measured visual acuity to the calculated $WA_{OTF}$ for the two or more lenses.

3. A lens pair designed according to the method of claim 2.

4. A lens pair designed according to the method of claim 1.

5. A method for designing a contact lens, comprising the steps of: (a.) providing a lens design for an eye or a lens wearer; (b.) selecting a weighting function that is a function of a neural contrast sensitivity function for application to the lens design; (c.) using the weighting function in a performance prediction model for lens design, wherein the performance predictive model correlates measured performance for two or more lens designs with predicted performance for the lens designs; and (d.) using the results obtained in step (c.) to optimize the lens designs wherein step (c) further comprises:
 (i) calculating a predicted visual performance using the prediction model by first calculating a weighted area of an optical transfer function according to the following equation:

$$WA_{OTF} = \int_{min}^{max} OTF(v, D, V) \times [\text{object contrast} \times NCSF(v, D, V, L)]^N dv$$

wherein:
 max and min define a frequency range over which the integration is performed;
 OTF is the optical transfer function calculated for the lens design at a retinal plane;
 v is a spatial frequency expressed as line pairs or cycles per degree of subtended angle at a fovea;
 D is a pupil diameter in millimeters;
 V is a vergence;
 object contrast is a value between 0 and 1 that represents a contrast of an object being viewed;
 NCSF is the neural contrast sensitivity function;
 L is a luminance of a room expressed in candelas/m$^2$; and
 N is an exponent with a value from 1 to −2
 and (ii) correlating the $WA_{OTF}$ to a measured visual performance of the two or more lenses.

6. A lens designed according to the method of claim 5.

* * * * *